UNITED STATES PATENT OFFICE.

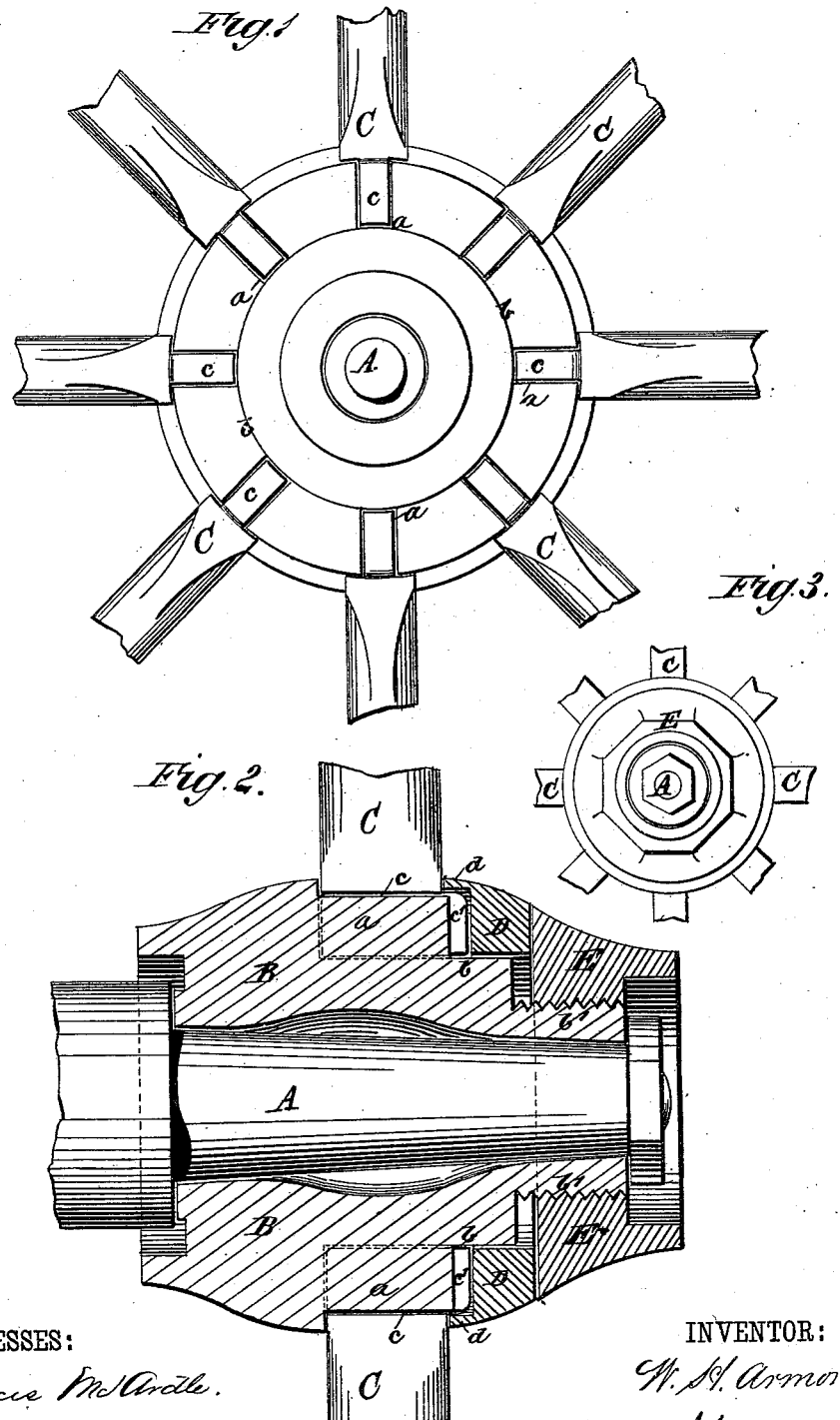

WILLIAM H. ARMOR, OF McKEESPORT, PENNSYLVANIA.

IMPROVEMENT IN VEHICLE-WHEEL HUBS.

Specification forming part of Letters Patent No. 208,279, dated September 24, 1878; application filed August 23, 1878.

*To all whom it may concern:*

Be it known that I, WILLIAM H. ARMOR, of McKeesport, in the county of Allegheny and State of Pennsylvania, have invented a new and Improved Wheel-Hub, of which the following is a specification:

The object of my invention is to provide an improved construction of wheels, whereby the spokes may be inserted in the fellies and the hub without cutting the tire, and their inner ends may be kept tightly secured in the hub.

The invention consists in a hub provided with radial mortises to receive the end tenons of the spokes, rabbeted outside of the spokes to the bottom of the mortises, and reduced in diameter and threaded from its outer end to the said rabbet, in combination with an end nut, a flanged washer or collar, and spokes having a lateral extension upon the outer edge of the said tenons, as will be hereinafter described.

In the accompanying drawings, Figure 1 is an outside view of a wheel-hub constructed according to my invention, the nut and washer being removed. Fig. 2 is a longitudinal section of the hub. Fig. 3 is an end view of the outer end of the same.

Similar letters of reference indicate corresponding parts.

A is the axle. B is the main part of the hub, or the hub proper. In the central cross-plane of the hub B are radial recesses or mortises $a$, for receiving the tenons $c$ of the inner end of the spokes C. At $b$ the hub B is rabbeted by turning it down flush with the bottom of the recesses $a$, leaving the latter open at the outer end, and thus allowing all the spokes to be first secured with their outer ends to the fellies of the wheel without cutting or removing the tire, and then all simultaneously inserted with their tenons $c$ into the mortises $a$ from the outer end of the hub A. The tenons $c$ have an extension or projection, $c'$, on their outer edge, which is covered by the collar or washer D, surrounding the rabbeted portion of the hub outside of the mortises, and by the circumferential flange $d$, formed upon the washer D at right angles to its base. The flange $d$ prevents the spokes from getting out of the hub radially, and also prevents the entrance of dust. The outer end of the hub B is threaded on the outside at $b'$, and provided with a nut, E, which at the same time constitutes the exterior of the outer end of the hub. By screwing the nut E onto the threaded shank $b'$ against the outer side of the washer D, the latter will be tightened against the spokes C, to hold them securely in place in the mortises $a$ of the hub.

If desired, the hub-nut E may be made of octagonal form, as shown in Fig. 3, to facilitate its turning by an ordinary wrench.

Having thus fully described my invention, I claim as new and desire to secure by Letters Patent—

The hub B, provided with the radial mortises $a$, to receive the end tenons $c$ of the spokes C, rabbeted at $b$ to the bottom of the mortises, and reduced in diameter and threaded at $b'$ from its outer end to the said rabbet $b$, in combination with the end nut, E, the flanged washer or collar D, and the spokes C, having the lateral extension $c'$ upon the outer edge of the said tenons $c$, substantially as and for the purpose set forth.

WILLIAM HUGH ARMOR.

Witnesses:
 DICKSON BAILIE,
 JAMES H. BERRY.